Oct. 2, 1951     O. J. B. ORWIN     2,569,947
CONVEYER CHAIN TRACK STRUCTURE

Filed June 30, 1949     2 Sheets—Sheet 1

INVENTOR:
Olaf John Barclay Orwin
BY Richardson, David and Nordon
Att'ys

Oct. 2, 1951 O. J. B. ORWIN 2,569,947
CONVEYER CHAIN TRACK STRUCTURE
Filed June 30, 1949 2 Sheets-Sheet 2
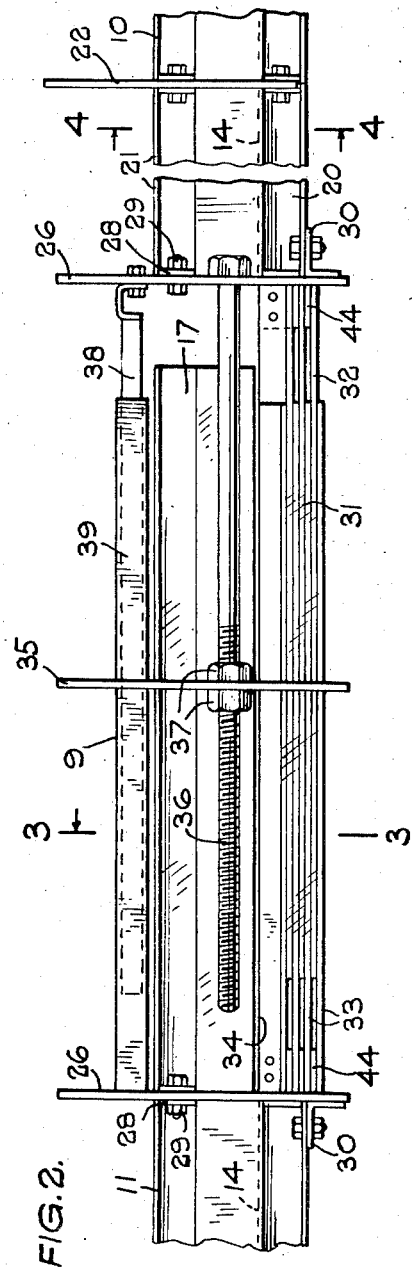
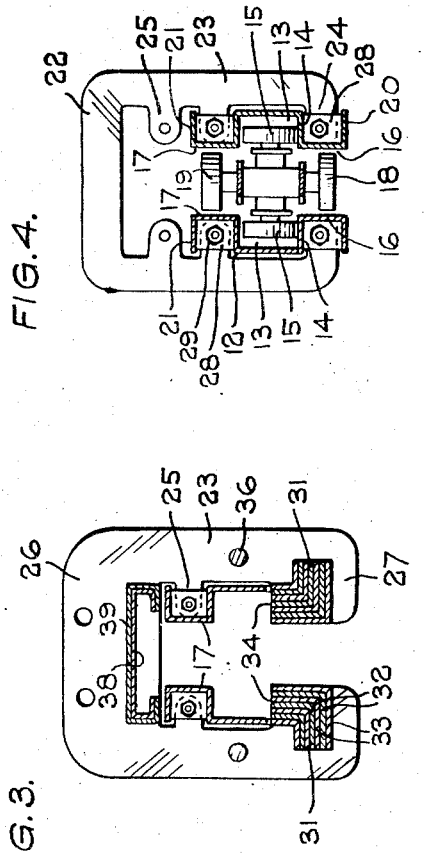
INVENTOR:
Olaf John Barclay Orwin
BY
Richardson, David and Verdon
Att'ys Patented Oct. 2, 1951

2,569,947

UNITED STATES PATENT OFFICE 2,569,947

CONVEYER CHAIN TRACK STRUCTURE

Olaf John Barclay Orwin, Smethwick, England, assignor to Fisher & Ludlow Limited, Smethwick, England, a British company Application June 30, 1949, Serial No. 102,357
In Great Britain July 10, 1948

4 Claims. (Cl. 198—177)

This invention relates to conveyors of the kind comprising an endless conveyor chain and a track for guiding the chain as well as for supporting the load-bearing elements of the chain, which elements commonly comprise rollers mounted on the chain for rotation about horizontal axes.

In assembling such conveyors it is necessary for the track in a direction parallel to the length of the chain thereby supported and guided, to have a length corresponding to the length of the chain, and it is impossible accurately to calculate the exact length of such conveyor chain when assembled, as owing to the number of links involved, more especially in the case of a relatively long chain, small variations in manufacturing tolerance at each link may, when added together over the whole length of the chain, result in quite a substantial variation in the chain length from the nominal length expected. Consequently it is necessary to provide some means for adjusting the length of the track to allow for such variation, while such adjustment is further necessary to take up the wear which occurs in the chain after a period of use, which wear results in quite an appreciable elongation to the chain, particularly where this is of substantial length.

Two methods have hitherto been commonly used to enable the length of the track to be adjusted in this way. In one of these methods the track is divided into two or more sections, and between each section are disposed one or more packing pieces, the length of which packing pieces is suitably chosen so as to give the desired overall length to the track and to effect any adjustment in the length thereof which may be necessary. This method provides a continuous horizontally aligned support for the load-bearing elements of the chain, but it is open to the disadvantage that a large number of packing pieces of different length must readily be available to enable the varying amounts of adjustment readily to be made to the length of the track, or alternatively the packing pieces must be cut specially to size each time an adjustment is made, and such operation of cutting the packing pieces to size may be inconvenient and it may not be possible readily to carry it out at the time that the adjustment is required, so that the conveyor may be out of operation for an appreciable period.

The other method which is commonly employed is to dispose two sections of the track in spaced aligned relationship and connect them by a bridge piece disposed in overlapping relationship with each section of the track including those parts thereof which support the load-bearing elements of the conveyor chain. For instance, in the case of an ordinary roller chain conveyor, the bridge piece may comprise a pair of angle members, the inner sides of the horizontal flanges of which are adapted to support the rollers, the outer sides of such flanges resting on the roller supporting portions of the two sections of the track, and in such an arrangement a continuously aligned support is no longer provided for the rollers or other load-bearing elements of the chain so that each time the same pass on to or off the bridge piece connecting the two track sections, considerable shock is imparted to the conveyor chain so that the arrangement is extremely noisy in operation and is conducive to rapid wear of the chain.

Furthermore, the provision of the bridge piece joining the two spaced track sections is a source of weakness in the track structure.

The present invention has for its object the provision of an improved construction which enables the length of the track to be readily adjusted and which at the same time avoids the disadvantages of the known arrangements above referred to.

According to the present invention the track comprises a pair of aligned sections connected together by a connecting member which is infinitely adjustable within predetermined limits longitudinally of the track and relative to one of the sections thereof to permit of infinite adjustment of the track length within such limits and of adjustment in the tension of the chain being made, the connecting member being adapted in any of its adjusted positions to provide a continuous support for the load-bearing elements of the chain, which support is aligned with the support provided for such elements by the two track sections, thereby providing a continuously substantially smooth path for the load-bearing elements of the chain as these pass from one section of the track to the other.

Referring to the drawings:

Figure 2 is a side elevation to an enlarged scale of part of the construction depicted in Figure 1.

Figure 1:
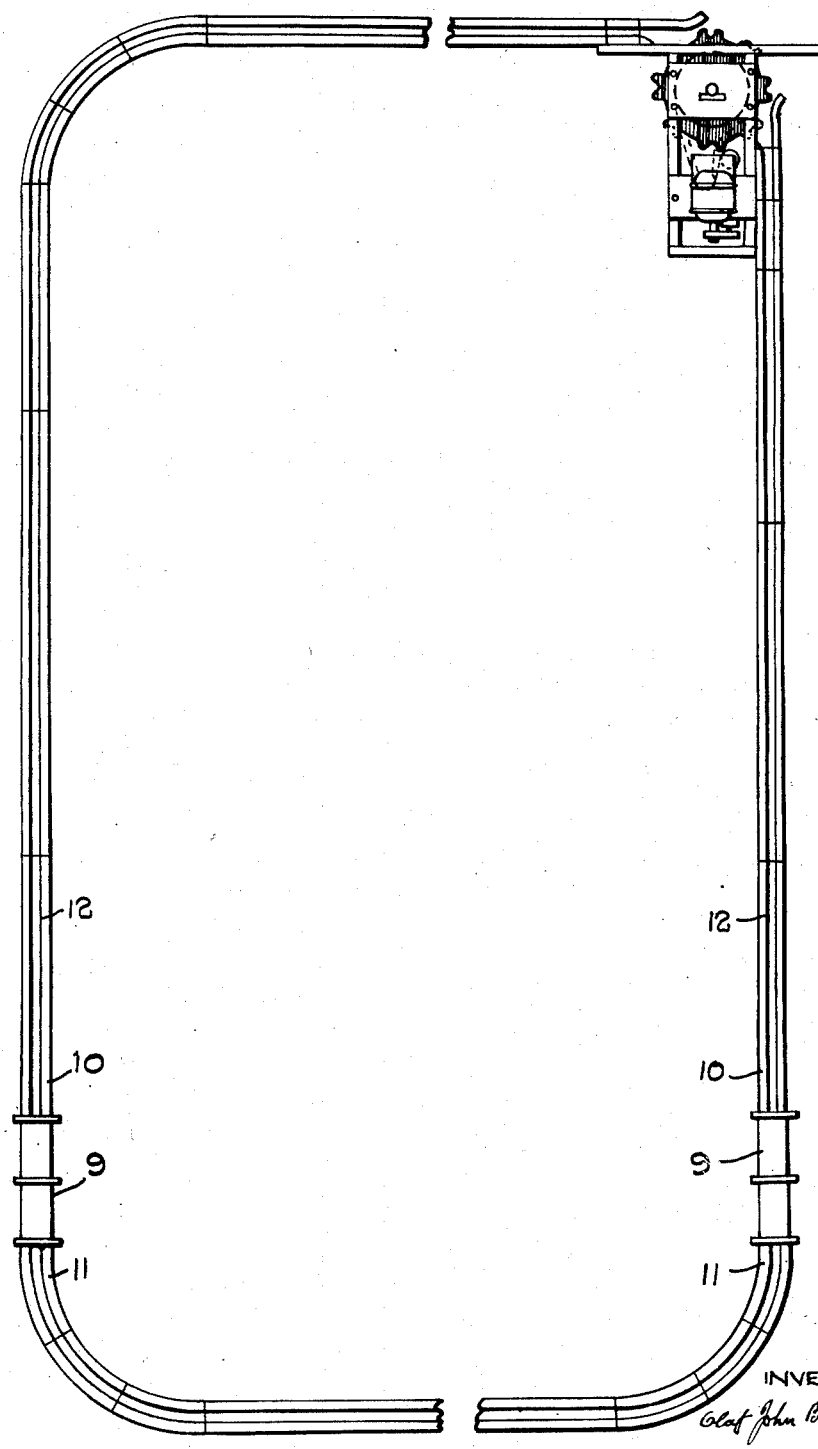
Figure 1 is a plan view of a complete conveyor system embodying the present invention.

Figures 3 and 4 are sectional views on the lines 3—3 and 4—4 of Figure 2.

Referring to the drawings, the invention is depicted as applied to a chain conveyor of the general form described in my copending application Serial No. 83,195, and comprising two track sections 10, 11 connected together at each of their ends by connecting members 9 constructed in accordance with the present invention so as to form a closed endless track for supporting an endless conveyor chain, one of which connecting members together with the adjacent parts of the track sections is depicted on an enlarged scale in Figure 2.

Each of the track sections comprises a pair of longitudinally extending rail elements 12 shown most clearly in Figure 4, each element being formed in sheet metal and comprising a portion 13 of channel form in cross section, the two channels being disposed opposite to one another so that their sides are horizontal, and the lower sides 14 thereof constitute guide flanges for supporting the load-bearing rollers of the conveyor chain described in my specification aforesaid, which load-bearing rollers are depicted at 15 in Figure 4.

The sides of each of the channels 13 are formed with oppositely directed vertically aligned guide flanges 16 and 17 which are adapted for guiding engagement with the lower and upper rollers 18 and 19 respectively of the sets of guide rollers which are mounted for rotation about vertical axes as described in my aforesaid specification.

The flanges 16 and 17 are formed with horizontally aligned oppositely directed edge flanges 20, 21 respectively which serve to stiffen the two rail elements 12, and the two elements are connected together in the above described relatively spaced relationship by means of connector plates 22 of substantially inverted U form in configuration, the dependent side portions 23 and these connector plates being formed along their opposed edges with integral oppositely directed lugs 24, 25 which extend respectively into the space above and below the edge flanges 20 and 21.

At each end of the connecting members 9 as well as intermediate such ends, I provide joining plates 26 of configuration similar to that of the connector plates 22, but the lugs 24 on these joining plates are omitted and replaced by lugs 27 which are disposed at a level beneath that of the edge flanges 20.

The rail elements 12 at the ends of the two track sections 10, 11 are secured to these joiner plates by welding square strips of metal 28 into each of the spaces beneath the edge flanges 21, so that they extend transversely to the length of the track, and providing securing bolts 29 which pass through holes in these square strips and in the lugs 25 of the joiner plates 26, while furthermore, brackets 30 are secured to the edge flanges 20, the brackets being welded to the lugs 27 aforesaid.

The rail elements constituting the track section 10 terminate at the joiner plate 26 which connects such track section to the connecting member as shown in the right-hand half of Figure 2, but the upper portions of the rail elements of the track section 11 extend beyond their corresponding joiner member and terminate a short distance from the end of the track section 10, the guide flanges 14, 16 of this extended portion as well as the edge flange thereof being cut away as is clearly shown in Figure 3. Thus the guide flanges 17 extend for substantially the full length of the track at each connecting member 9 so that the upper rollers 19 of the sets of guiding rollers are guided over substantially the whole length of each of these connecting members.

The lower bearing rollers 15 are supported throughout the entire length of each connecting member between the two track sections by means of two sets of extensible supporting rails 31, each set of rails consisting of a number of nested bars of angle form in cross section, of which alternate bars 32 which constitute male elements, are connected to the joiner plate 26 associated with the track section 10, the remaining alternate bars 33, and which constitute collectively female elements, being connected to the joiner plate 26 associated with the track section 11.

The two sets of bars are disposed with their flanges respectively horizontal and vertical, and the upper edge 34 of the vertical flanges constitutes a track for supporting the load-bearing rollers 15, which track is aligned with the upper face of the flanges 14 of the rail elements.

The two sets of bars 32, 33 are capable of relative sliding movement in a direction longitudinally of the track, but are precluded from relative lateral movement in either a vertical or a horizontal direction by virtue of their angle configuration and the fact that they are nested one within the other, and by virtue also of the fact that they are connected rigidly to the corresponding joiner plates 26. Such rigid connection is conveniently obtained by disposing short brackets 44 in the spaces between the adjacent bars in each set at their ends, the brackets being of angle form in cross section, having their upper edges aligned with the upper edges of the bars themselves and being welded to the adjacent faces of the joiner plates 26.

In order to secure the two sets of bars 32, 33 against relative longitudinal movement as well as to permit of such movement, an intermediate joiner plate 35 is provided of a configuration similar to that of the joiner plates 26, and this is secured to the female elements only of the adjustable track 31, namely to the bars 33, and is further secured to the part of the track section 11 which extends between the two joiner plates 26, such securing being effected by welding.

The plate 35 is connected adjustably to the joiner plate 26 associated with the track section 10 by providing this latter joiner plate with a pair of longitudinally extending adjusting members 36 in the form of threaded studs, these being secured rigidly to the joiner plate 26 aforesaid and extending freely through holes formed in the plate 35 and carrying adjusting nuts 37 on each side of this plate so that by turning the nuts, the track section 11 can be displaced longitudinally in either direction in relation to the track section 10, the bars 33 sliding relative to the bars 32 during such movement, such adjustment being capable of infinite variation within the limits imposed by the length of the overlapping portions of the bars 32, 33 and the length of the threaded part of the adjusting members 36.

The interengagement between the two sets of bars 32, 33 of each adjustable track element 31 serves to locate the lower portion of each track section 10, 11 against relative lateral movement, and the upper portions of the two track sections 10, 11 are located against such movement by providing the joiner plate 26 associated with the track section 10 with a longitudinally extending male guide element 38 of inverted channel configuration, the sides of which are formed with opposed horizontal edge flanges, which male element engages slidably within a corresponding female guide element 39 secured rigidly to the plate 35 as well as to the plate 26 associated with the track section 11.

The invention thus provides means for infinitely varying within given limits the effective length of the track in which horizontal load supporting rollers of the conveyor chain pass from one section of the track to the other without shock, and the disadvantages of the hitherto known methods of adjusting the track length are avoided.

What I claim then is:

1. In a conveyor comprising an endless conveyor chain including pairs of transversely spaced load-bearing rollers and a track for supporting the load-bearing rollers and guiding the chain, the provision of a pair of longitudinally spaced and aligned track sections, a connecting member connecting said track sections together, said connecting member comprising two assemblies of nested bars of right angle form in cross section, each disposed with one of their two flanges vertical, the upper edges of which flanges are adapted to provide a support for the load-bearing rollers in alignment with the support provided for such rollers by the two track sections, each assembly supporting one of the two rollers at each side of the track, and each assembly comprising two sets of bars, the bars in one set alternating with the bars in the other set, each set of bars being associated rigidly with one track section, the two sets being disposed in overlapping relationship and slidable relative to one another in a direction longitudinally of the track, and means for locating the bars against relative longitudinal sliding movement.

2. In a conveyor comprising an endless conveyor chain including pairs of transversely spaced load-bearing rollers and a track for supporting the load-bearing rollers and guiding the chain, the provision of a pair of longitudinally spaced and aligned track sections, a connecting member connecting said track sections together, said connecting member comprising two assemblies of nested bars of right angle form in cross section, each disposed with one of their two flanges vertical, the upper edges of which flanges are adapted to provide a support for the load-bearing rollers in alignment with the support provided for such rollers by the two track sections, each assembly supporting one of the two rollers at each side of the track, and each assembly comprising two sets of bars, the bars in one set alternating with the bars in the other set, the two sets being disposed in overlapping relationship and slidable relative to one another in a direction longitudinally of the track, a pair of longitudinally spaced transversely disposed plates connected rigidly one to each of said sets of bars in each assembly, means securing said plates rigidly one to each track section, means for adjusting said plates relative to one another in a direction longitudinally of the conveyor track, and means for securing said plates against relative longitudinal movement.

3. In a conveyor comprising an endless conveyor chain including pairs of transversely spaced load-bearing rollers and a track for supporting the load-bearing rollers and guiding the chain, the provision of a pair of longitudinally spaced and aligned track sections, a connecting member connecting said track sections together, said connecting member comprising two assemblies of parallel vertically extending bars, the upper edges of which are adapted to provide a support for the load-bearing rollers in alignment with the support provided for such rollers by the two track sections, each assembly supporting one of the two rollers at each side of the track and each assembly comprising two sets of bars, the bars in one set alternating with the bars in the other set, the two sets being disposed in overlapping relationship and slidable relative to one another in a direction longitudinally of the track, a pair of longitudinally spaced transversely disposed plates connected rigidly one to each of said sets of bars in each assembly, means securing said plates rigidly one to each track section, a pair of longitudinally extending screwed studs, the studs being secured rigidly to one of said plates, the other of said plates being formed with holes through which said studs extend freely, and adjusting nuts on said screwed studs engaging opposite sides of the plate through which said studs extend.

4. Apparatus according to claim 3, wherein male and female guide elements are provided, said elements extending longitudinally of the conveyor track and engaging slidably one within the other, said elements being disposed adjacent the upper part of the connecting member and being rigidly connected one to each of the said two plates.

OLAF JOHN BARCLAY ORWIN.

REFERENCES CITED

The following references are of record in the file of this patent:

UNITED STATES PATENTS

| Number | Name | Date |
| --- | --- | --- |
| 1,785,315 | Kennedy | Dec. 16, 1930 |
| 1,875,535 | Whitney | Sept. 6, 1932 |
| 1,876,373 | Whitney | Sept. 6, 1932 |